US 6,577,720 B1

(12) United States Patent
Sutter

(10) Patent No.: US 6,577,720 B1
(45) Date of Patent: Jun. 10, 2003

(54) SYSTEM AND METHOD FOR PROVIDING HIGH-SPEED COMMUNICATIONS USING A PUBLIC TERMINAL

(75) Inventor: Michael J. Sutter, Piffard, NY (US)

(73) Assignee: Nortel Networks Corporation, Quebec (CA)

( * ) Notice: Subject to any disclaimer, the term of this patent is extended or adjusted under 35 U.S.C. 154(b) by 0 days.

(21) Appl. No.: 09/474,124

(22) Filed: Dec. 29, 1999

(51) Int. Cl.[7] .................. H04M 17/00; H04M 11/00
(52) U.S. Cl. .................. 379/144.05; 379/93.05; 379/93.09; 379/93.22; 370/354
(58) Field of Search .................. 379/88.13, 93.01, 379/93.05, 93.07, 93.09, 93.12, 93.19, 93.24, 93.21, 93.22, 93.25, 100.01, 100.03, 100.04, 900, 906, 112, 113, 114, 144, 155; 235/380, 381; 705/25, 29, 40; 370/352–354

(56) References Cited

U.S. PATENT DOCUMENTS

| | | | | |
|---|---|---|---|---|
| 4,894,717 A | * | 1/1990 | Komei | 358/108 |
| 5,008,928 A | * | 4/1991 | Cleghorn | 379/100 |
| 5,105,460 A | * | 4/1992 | Williams | 379/434 |
| 5,483,582 A | * | 1/1996 | Pugh et al. | 379/144 |
| 5,550,917 A | * | 8/1996 | Tallec | 379/442 |
| 5,812,643 A | * | 9/1998 | Schelberg et al. | 379/93.12 |
| 5,812,765 A | * | 9/1998 | Curtis | 395/200.3 |
| 5,881,141 A | * | 3/1999 | Park | 379/155 |
| 5,923,736 A | * | 7/1999 | Shachar | 379/93.17 |
| 5,970,477 A | * | 10/1999 | Roden | 705/32 |
| 5,978,460 A | * | 11/1999 | Butts et al. | 379/145 |
| 6,081,791 A | * | 6/2000 | Clark | 705/43 |
| 6,115,755 A | * | 9/2000 | Krishan | 709/250 |
| 6,118,860 A | * | 9/2000 | Hillson et al. | 379/155 |
| 6,137,869 A | * | 10/2000 | Voit et al. | 379/114 |
| 6,141,684 A | * | 10/2000 | McDonald et al. | 709/222 |
| 6,163,535 A | * | 12/2000 | Jordan et al. | 370/352 |
| 6,243,450 B1 | * | 6/2001 | Jansen et al. | 379/144 |
| 6,246,695 B1 | * | 6/2001 | Seaholtz et al. | 370/468 |
| 6,314,169 B1 | * | 11/2001 | Schelberg, Jr. et al. | 379/93.12 |
| 6,320,946 B1 | * | 11/2001 | Enzmann et al. | 379/143 |
| 6,466,658 B2 | * | 10/2002 | Schelberg, Jr. et al. | 379/93.12 |

* cited by examiner

*Primary Examiner*—Binh Tieu
(74) *Attorney, Agent, or Firm*—Hunton & Williams LLP

(57) ABSTRACT

A system and method that enables high-speed communications access from a fixed location public terminal. A fixed location public terminal includes a high-speed communications interface. The high-speed communications interface is coupled to one or more data servers via a high-speed communications network. The high-speed communications interface includes one or more data ports enabling one or more data application devices to be connected to the fixed location public terminal. The fixed location public terminal operates as an interface that initiates high-speed communications between the one or more data servers and one or more data application devices. A user places a telephone call to a high-speed data communications provider. The telephone call terminates at a data server that determines a data port address of the fixed location public terminal according to a plain-old-telephone system (POTS) number assigned to the fixed location public terminal. The data server also authorizes payment for the high-speed data communications and enables high-speed communications access using the high-speed communications interface.

30 Claims, 3 Drawing Sheets

Figure 1:
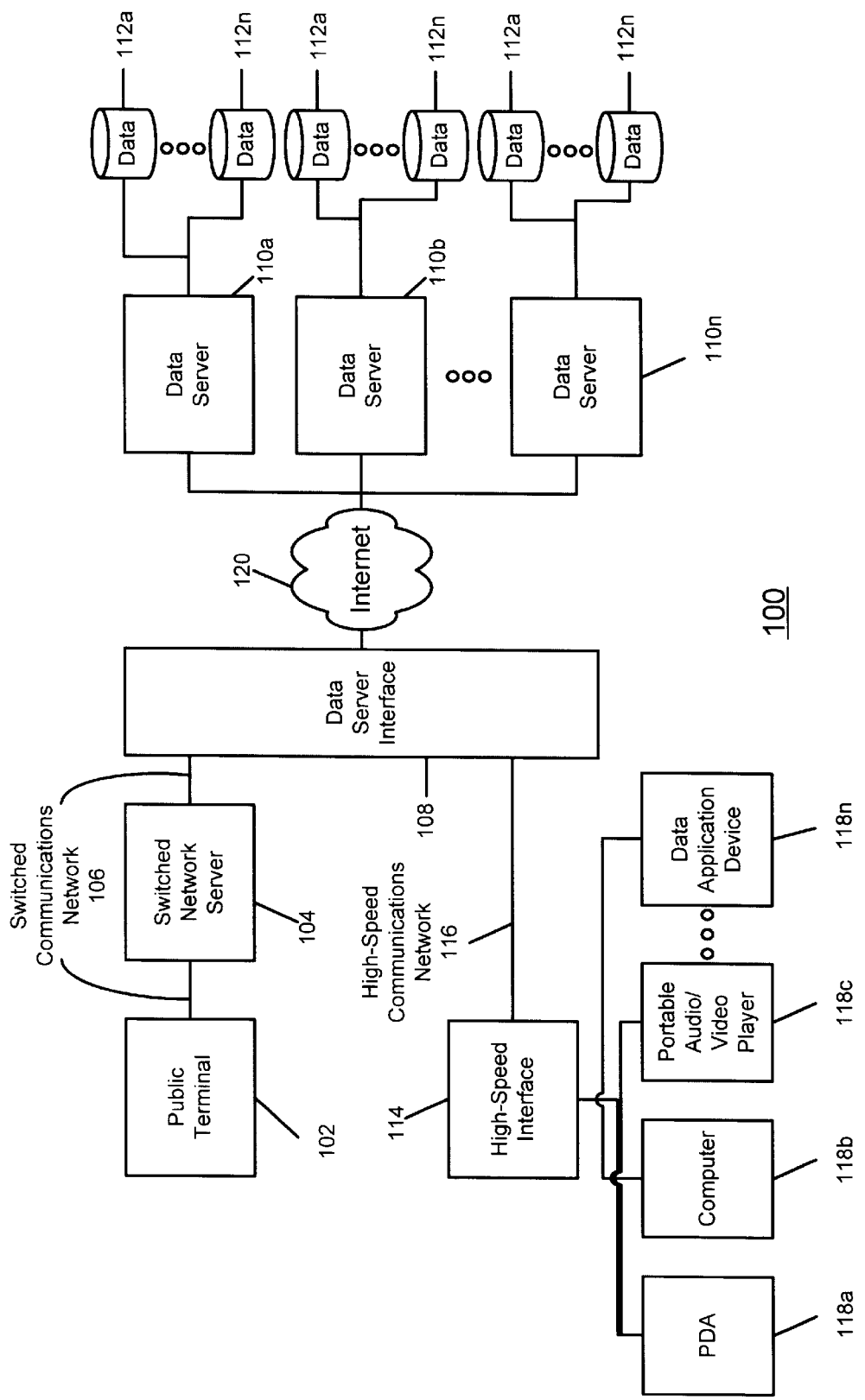

SYSTEM AND METHOD FOR PROVIDING HIGH-SPEED COMMUNICATIONS USING A PUBLIC TERMINAL

FIELD OF THE INVENTION

The invention relates generally to high-speed data communications, and more particularly to a system and method for enabling fixed location public terminals to be used as an interface to high-speed data communications.

BACKGROUND OF THE INVENTION

Devices exist which enable access to information sources from fixed location public terminals, such as pay telephones and special purpose kiosks. These facilities enable users to access and/or download various types of data, such as electronic mail or Internet/Intranet web sites. Access is typically provided over a switched network, typically over the public switched telephone network (PSTN) by coupling a modem to telephone lines. Switched networks, particularly the PSTN, do not provide high-speed communications between a data application and consumers of those services. Users are instead generally limited to low-speed data access using modem devices to communicate digital data over analog lines. This increases the amount of time a user must spend accessing desired information.

Besides speed, another problem with current public data access points is a need for specialized billing interfaces. Data access circuits require a separate specialized billing interface other than the one already provided with the fixed location public terminal. Additionally, because the data access connections are low-speed, the amount of time that a user must be connected to access desired information increases the cost of the data access as well. The user may also be required to pay a separate connect cost. Furthermore, specialized billing interfaces used to activate these services may require users to associate with unknown billing service providers.

Another disadvantage with existing public point data access systems is the inability to provide a voice communications path in addition to a data communications path. If a user desires to speak with, for example, a customer representative of a service provider associated with a service the user is accessing, the user must disconnect the data connection and place a telephone call to the service provider. Current systems do not enable users to maintain both voice and data communications paths simultaneously.

Accordingly, a need exists for an improved system and method of providing high-speed communications access from a fixed location public terminal.

A need also exists for providing high-speed communications from a fixed location public terminal that utilizes a similar billing infrastructure to that already provided for the fixed location public terminal.

A need also exists for enabling users of fixed location public terminals to maintain both voice and data communications paths open during a single session.

SUMMARY OF THE INVENTION

The invention solving these and other problems relates to a high-speed communications interface coupled to a fixed location public terminal (e.g., pay telephone), which may be used to initiate high-speed communications to a data application device through the high-speed communications interface. The high-speed communications interface enables a data application device to be connected to the fixed location public terminal and establish high-speed communications with one or more data services to access information at a terminal point.

According to one embodiment of the invention, a fixed location public terminal is provided with a high-speed communications interface. The high-speed communications interface may include a standard high-speed communications jack or outlet for connecting a data application device, such as an integrated services digital network (ISDN) or digital subscriber line (DSL) connection. To activate the system, a user may place an ordinary telephone call to a high-speed data communications provider. The telephone call terminates at a call server. The call server determines a data port address associated with a plain-old-telephone system (POTS) number assigned to the fixed location public terminal being used for access. The call server may first enable the user to select a payment method. After a payment method is authorized over the PSTN, the call server enables the user to establish high-speed communications between a data application device and one or more data servers over a separate high-speed communications network terminating at the fixed location public terminal. After the user finishes using their high-speed data services, the call server may terminate the high-speed communications with the data application device.

According to another aspect of the invention, a method is disclosed for providing a fixed location public terminal with high-speed communications access. The fixed location public terminal may already be available for use. In the method, a high-speed communications network is coupled to the fixed location public terminal and a call server interface. The high-speed communications interface at the fixed location public terminal is then activated using the telephone-side connection. The high-speed communications interface enables users to use various types of data application services to the fixed location public terminal, for example to download email, news, liquid audio or other content at the fixed location public terminal.

The invention in another regard relates to a method for providing high-speed communications to and from a fixed location public terminal. A user connects a data application device to the fixed location public terminal using, for example, a standardized high-speed communications jack or outlet located on a high-speed communications interface coupled to the fixed location public terminal. The user places a telephone call to a call server front-end of a high-speed communications provider or service. The telephone call terminates at a call server associated with the high-speed communications provider or service. The call server determines the data port address of the fixed location public terminal from which the telephone call was placed using the POTS number of the fixed location public terminal. The call server then connects to the data port of the high-speed communications interface coupled to the fixed location public terminal. The user may then select the information desired to access or download, such as voice mail, electronic mail, video messaging or liquid musics. The fixed location public terminal may use conventional billing mechanisms serviced by the call server for determining the cost and duration of the call. After the user completes the high-speed communications, the user may simply hang-up the telephone thereby terminating both the voice and data communication links.

DETAILED DESCRIPTION OF PREFERRED EMBODIMENTS

The high-speed communications interface provided by the invention enables various types of data application devices, such as portable computers, personal digital assistants (PDA), portable audio/video players, such as MP3 players and web-enabled cellular telephones to connect to one or more data services using a fixed location public terminal, and establish high-speed communications with data services of their choosing.

The invention in one regard relates to a fixed location public terminal provided with high-speed communications access. The fixed location public terminal is coupled to a high-speed communications network using a separately wired high-speed communications interface, such as ISDN, DSL, cable modem or other protocol. The high-speed communications interface may be provided with one or more standardized high-speed communications jacks or outlets. The standardized high-speed communications jacks or outlets enable various types of data application devices to be connected to the fixed location public terminal. The fixed location public terminal may then be used as an interface for high-speed communications with networked data services, such as the Internet/Intranet.

FIG. 1 is a block diagram illustrating a high-speed communications system 100 according to one embodiment of the invention. System 100 comprises a fixed location public terminal 102 coupled to a switched network server 104 via a switched network 106, such as the PSTN. Switched network server 104 may be a call server, call center or other hardware which provides access to networked data resources, illustratively the Internet 120 through which access is gained to one or more remote data servers 108a–108n. Switched network server 104 may be, or include, for instance, a workstation running Microsoft Windows™ NT™, Unix, Linux, Xenix, Solaris™, OS/2™, BeOS™, Mach, Apache, OpenStep™ or other operating system or platform software. Data servers 108a–108n access data stored in one or more databases 110a–110n. Fixed location public terminal 102 also includes a high-speed communications interface 112 coupled to data servers 108a–108n via a high-speed communications network 114. Communications network 114 may be or include as a segment any one or more of, for instance, the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL connection, an Ethernet connection, an ISDN line, a cable modem, an ATM (Asynchronous Transfer Mode) connection, or FDDI (Fiber Distributed Data Networks) or CDDI (Copper Distributed Data Interface) connections. One or more data application devices, such as a personal digital assistant, portable computer, portable audio/video players, such as an MP3 player, web-enabled cellular telephone or others 116a–116n may be connected to high-speed communications interface 112 to establish high-speed communications to the Internet 120.

As shown in FIG. 1, the Internet 120 and attendant resources may provide high-speed communications access to information stored in one or more remote databases 112a–112n. A user may thus utilize a fixed location public terminal 102 to access databases 112a–112n via a high-speed communications network 116.

The high-speed communications interface 114 located at or in the fixed location public terminal 102 enables one or more data application devices 118a–118n to be connected to fixed location public terminal 102. Data application devices 118a–118n may connect to a data port of high-speed communications interface 114 by determining a data port address. The data port address may be, for instance, an Internet protocol (IP) address uniquely associated with the POTS number of the fixed location public terminal.

Again, the fixed location public terminal 102 is coupled to a switched network server 104 via a switched network 106, such as the PSTN, which does not enable high-speed communications but in the practice of the invention serves as an interface to activate, bill; and terminate a separate high-speed data connection.

Figure 2:
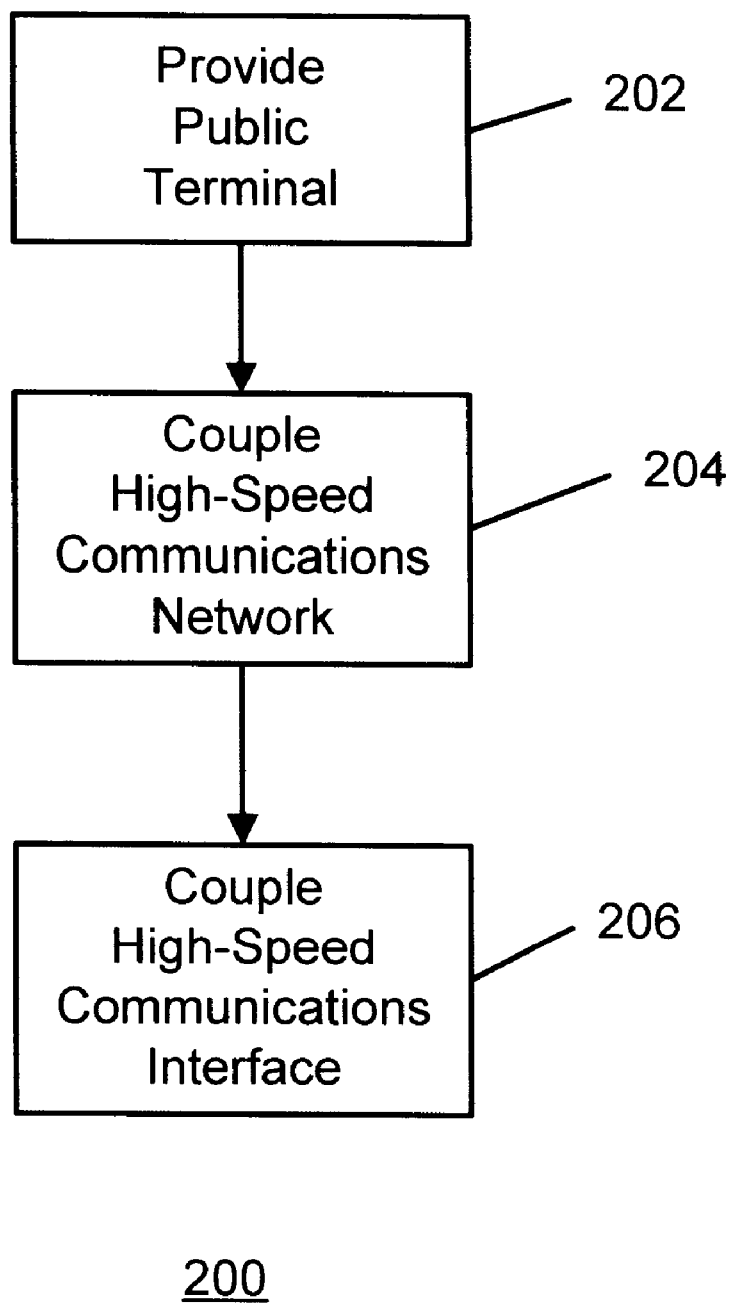

FIG. 2 is a flowchart illustrating a method 200 of enabling high-speed communications using a fixed location public terminal according to the invention. In step 202, a fixed location public terminal 102 is provided. This step may be performed using a fixed public terminal that is available for use. The fixed location public terminal 102 may be, again, a pay telephone, kiosk, etc. A high-speed communications network is coupled to the fixed location public terminal in step 204. In step 206, the fixed location public terminal is coupled with a high-speed communications interface, for instance by generating a lookup table of IP addresses associated with cable modem hubs, ISDN terminals or other broadband resources with the 10 digit telephone number of fixed location public terminal 102.

Figure 3:
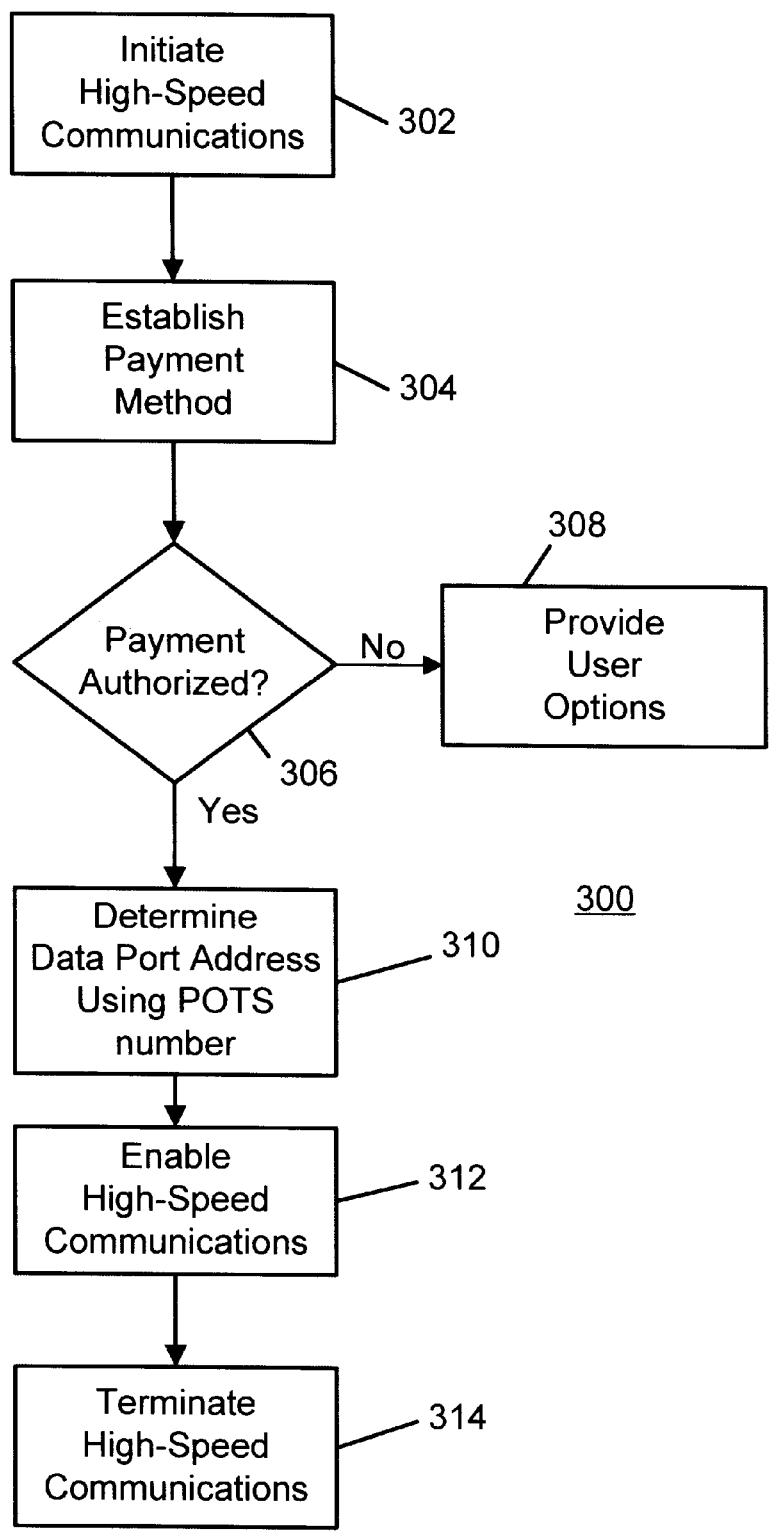

FIG. 3 illustrates a flowchart of a method 300 of establishing high-speed communications in accordance with one embodiment of the invention. In step 302, high-speed communications are initiated with one or more data servers via the fixed location public terminal 102. In step 304, a payment method for example, credit card, calling card, bill to third party, bill to home telephone number, is established that a user may choose for paying for a high-speed communications access session. In step 306, the payment method is authorized. If the payment method is not authorized, step 308 may provide a user with various reauthorization options. For example, the user may elect another payment method, terminate the connection, etc.

If the payment method is authorized, step 310 determines the data port address for the fixed location public terminal using the POTS number associated therewith. For example, the fixed location public terminal may be a pay telephone having the telephone number 555-555-5555. Based on this telephone number (or other network address equivalent), step 310 determines the data port address associated with the telephone number. For example, the data port address may be the IP address 012.345.678.901. Therefore, step 310 determines that IP address 012.345.678.901 is associated with that fixed location public terminal.

After determining the data port address, step 312 may enable high-speed communications from a high-speed communications interface. In step 312, high-speed communications between a data application device connected to the high-speed communications interface and one or more data server are enabled or activated using the high-speed communications network. After a user has completed the high-speed communications session, the high-speed communications connection may be terminated in step 314.

An example of a session establishing high-speed communications using a fixed location public terminal in accordance with FIG. 1 will be further described. A user may be located at fixed location public terminal 102, from which the user may desire to establish high-speed communications with a data server, for example, to download music, video, electronic mail, etc., to one or more data application devices 118a–118n. The user connects one or more data application devices 118a–118n to one or more data ports of high-speed interface 114. The user may then initiate high-speed communications. If This may be performed, for example, by placing a telephone call to a toll-free access number of a high-speed communications access provider. The telephone call may be routed to a switched network server 104 of that provider over switched network 106.

Switched network server 104 may then communicate with data server interface 108. Data server interface 108 may be used to determine which data server 110a–110n should be accessed next. Data server interface 108 then communicates with the intended data server 110a–110n. Data server 110a–110n enables the user to establish high-speed communications using high-speed communications interface 114, in part by establishing a payment method to be used for the high-speed communications access. Data server 110a–110n may provide the user with a plurality of payment options. For example, the user may elect to pay by credit card, calling card, debit card, bill to home telephone number, bill to third-party, cash, etc. The user may input a card or telephone number using, for example, voice recognition software or a telephone keypad.

After the user has input the payment method, data server 110a–110n determines whether the payment method selected is authorized. If the payment method selected is not authorized, data server 110a–110n may provide the user with alternative options (e.g., pay by different payment method, terminate telephone call). If, however, the payment method is authorized, data server 110a–110n enables activation of high-speed communications interface 114. The user may then establish high-speed communications with the Internet 120 and other resources such as data server 110a–110n over high-speed communications network 116 from a data application device 118a–118n. For example, the user may access one or more databases 112a–112n through data server 110a–110n to download music or video onto a portable video or audio player or portable computer, electronic mail onto a computer or personal digital assistant (PDA) or access one or more Internet web sites using a web browser.

According to one embodiment, a voice communications connection over the PSTN used to initiate the high-speed communications may be maintained while a user is accessing data using high-speed communications interface 114. This provides a voice path for attendant functions, such as simultaneous customer support or low-speed modem connections during the delivery of data services at publicly available terminals. Alternatively, after a high-speed data communications path has been established, the voice communications connection over the PSTN used for initiating the high-speed communications may be dropped enabling the user to use the fixed location public terminal as usual.

The foregoing description of the system and method for providing high-speed communications using a public terminal is illustrative, and changes in the above construction and sequences of operation will occur to persons skilled in the art. For example, the fixed location public terminal may be provided with multiple high-speed communications paths and the high-speed communications path may be provided over an intranet. Therefore, the scope of the invention is accordingly intended to be limited only by the following claims.

What is claimed is:

1. A communications interface, comprising:
  a first interface connected to a switched communications network, for allowing a user to interactively communicate with the switched communications network; and
  a second interface for connecting at least one portable data application device to a high-speed communications network, the second interface coupled to the first interface through a remote data server interface, the high-speed communications network providing data access through the second interface upon activation via a user interactive communication through the first interface to the remote data server interface for data transmission at the second interface.

2. The communications interface of claim 1, wherein the high-speed communications network comprises at least one of an integrated services digital network connection, a digital subscriber line connection, and a cable modem connection.

3. The communications interface of claim 1, wherein the first interface comprises a public pay telephone.

4. The communications interface of claim 1, wherein the switched communications network comprises the public switched telephone network.

5. The communications interface of claim 1, wherein the activation comprises an authorization billing for use of the second interface performed by a service used for billing the first interface.

6. A communications interface, comprising:
  switched communications network interface means for interfacing to a switched communications network for allowing a user to interactively communicate with the switched communications network; and
  high-speed communications network interface means for interfacing to a high-speed communications network, the high-speed communications network interface means coupled to the switched communication network means through a remote data server interface means, the high-speed communications network providing data access through the high-speed communications network interface means to at least one portable data application device upon activation via a user interactive communication through the switched communications network interface means to the remote data server interface means for data transmission at the high-speed communications network interface means.

7. The communications interface of claim 6, wherein the high-speed communications network comprises at least one of an integrated services digital network connection, a digital subscriber line connection, and a cable modem connection.

8. The communications interface of claim 6, wherein the switched communications network comprises the public switched telephone network.

9. The communications interface of claim 6, wherein billing for use of the second interface is performed by a service used for billing the first interface.

10. A communications method, comprising the steps of:
  a) providing a fixed location public terminal having a first interface connected to a switched communications network for allowing a user to interactively communicate with the switched communications network;
  b) coupling to the fixed location public terminal a second interface for connecting at least one portable data application device to a high-speed communications interface, the second interface coupled to the first interface through a remote data server interface; and
  c) activating access to the high-speed communications network via a user interactive communication through the first interface to the remote data server interface for data transmission at the second interface.

11. The method of claim 10, further comprising a step of (d) billing a user for use of the high-speed communications interface.

12. The method of claim 11, wherein the step (d) of billing is performed by a service used for billing of the fixed location public terminal.

13. The method of claim 10, wherein the fixed location public terminal comprises a public pay telephone.

14. A high-speed communications system, comprising:
- a fixed location public terminal;
- a switched network coupled to the fixed location public terminal for allowing a user to interactively communicate with the switched communications network;
- a high-speed communications interface coupled to the fixed location public terminal;
- a high-speed communications network coupled to the high-speed communications interface, where the high-speed interface connects at least one portable data application to the high-speed communications network and is activated via a user interactive communication through the communications interface-to a remote data server interface; and
- at least one data resource coupled to the high-speed communications network.

15. The high-speed communications network of claim 14, wherein the fixed location public terminal comprises a pay telephone.

16. The high-speed communications network of claim 14, wherein the high-speed communications network comprises at least one of an integrated services digital network connection, a digital subscriber line connection, and a cable modem connection.

17. The high-speed communications network of claim 14, wherein billing for use of the high-speed communications interface is performed by a service used for billing of the fixed location public terminal.

18. The high-speed communications network of claim 14, wherein the switched communications network comprises the public switched telephone network.

19. A communications interface system, comprising:
- a public terminal having a first interface and a second interface;
- a plurality of data servers storing data; and
- a data server interface remote from the public terminal and operatively connected to the first interface, the second interface and the plurality of data servers, where the data server interface activates access to a high-speed communications network at the second interface in response to a request from the first interface.

20. The system of claim 19, wherein the data server interface forwards the request to at least one data server and activates access to the high speed communications network based on the response received from the at least one data server.

21. The system of claim 19, wherein the first interface comprises a public pay telephone.

22. The system of claim 19, wherein the data server interface is connected to the first interface through a switched communications network.

23. The system of claim 22, wherein the switched communications network comprises the public switched telephone network.

24. The system of claim 19, wherein the activation comprises an authorization billing for use of the second interface performed by a service used for billing the first interface.

25. A method for activating a communications interface system, comprising the steps of:
- providing a fixed location public terminal having a first interface operatively connected to a data server interface, where the data server interface is remote from the fixed location public terminal;
- coupling a second interface to the fixed location public terminal, where the second interface is operatively connected to a high-speed communication network and to the data server interface; and
- activating access to the high-speed communications in response to a request received at the data server interface from the first interface.

26. The method of claim 25, wherein the data server interface forwards the request to at least one data server and activates access to the high speed communications network based on the response received from the at least one data server.

27. The method of claim 25, wherein the first interface comprises a public pay telephone.

28. The method of claim 25, wherein the data server interface is connected to the first interface through a switched communications network.

29. The method of claim 28, wherein the switched communications network comprises the public switched telephone network.

30. The method of claim 25, wherein the activation comprises an authorization billing for use of the second interface performed by a service used for billing the first interface.

* * * * *